(12) United States Patent
Inoue (10) Patent No.: US 10,328,542 B2
(45) Date of Patent: Jun. 25, 2019

(54) TOOL PATH-GENERATING METHOD, DRILLING METHOD, AND TOOL PATH-GENERATING DEVICE

(71) Applicant: MAKINO MILLING MACHINE CO., LTD., Tokyo (JP)

(72) Inventor: Kosuke Inoue, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 6 days.

(21) Appl. No.: 15/562,735

(22) PCT Filed: Mar. 31, 2015

(86) PCT No.: PCT/JP2015/060270
§ 371 (c)(1),
(2) Date: Sep. 28, 2017

(87) PCT Pub. No.: WO2016/157456
PCT Pub. Date: Oct. 6, 2016

(65) Prior Publication Data
US 2018/0079043 A1   Mar. 22, 2018

(51) Int. Cl.
*B23Q 15/00* (2006.01)
*G05B 19/4093* (2006.01)
*G05B 19/29* (2006.01)

(52) U.S. Cl.
CPC .............. *B23Q 15/00* (2013.01); *G05B 19/29* (2013.01); *G05B 19/4093* (2013.01);
(Continued)

(58) Field of Classification Search
CPC .. B23Q 15/00; G05B 19/40938; G05B 19/29; G05B 19/4093; G05B 2219/34175;
(Continued)

(56) References Cited

U.S. PATENT DOCUMENTS 5,888,037 A * 3/1999 Fujimoto ............. G05B 19/416
408/1 R
9,977,421 B2 * 5/2018 Brambs ................ G05B 19/416

FOREIGN PATENT DOCUMENTS

JP      4-317104      11/1992
JP      9-120310       5/1997
(Continued)

OTHER PUBLICATIONS

International Search Report dated Jun. 30, 2015, directed towards PCT Application No. PCT/JP2015/060270; 1 page.
(Continued)

*Primary Examiner* — Christopher E. Everett
(74) *Attorney, Agent, or Firm* — Morrison & Foerster LLP (57) ABSTRACT

A tool path-generating device for generating a tool path for moving a tool and a workpiece relative to each other and processing said workpiece is equipped with: an opposite path-extracting section for extracting two tool paths, the movement directions of which are roughly opposite to each other; a reversal position-calculating section for calculating a reversal position at which the tool feed direction is reversed at a position, between the endpoint of one of the two tool paths and the starting point of the other of the two tool paths, that is separated from the workpiece; and a reversal path-generating section for calculating a connecting path that passes through the endpoint of one of the two tool paths, the reversal position, and the starting point of the other of the two tool paths.

1 Claim, 5 Drawing Sheets

(52) U.S. Cl.
CPC ............... *G05B 19/40938* (2013.01); *G05B 2219/34175* (2013.01); *G05B 2219/36342* (2013.01); *G05B 2219/49363* (2013.01); *G05B 2219/49365* (2013.01)

(58) Field of Classification Search
CPC ........... G05B 2219/49365; G05B 2219/49363; G05B 2219/36342
See application file for complete search history.

(56) References Cited

FOREIGN PATENT DOCUMENTS

| | | |
|---|---|---|
| JP | 2003-223208 | 8/2003 |
| JP | 2006-024174 | 1/2006 |

OTHER PUBLICATIONS

International search report dated Jun. 30, 2015; directed to PCT Application No. PCT/JP2015/060270; 1 page.

\* cited by examiner

TOOL PATH-GENERATING METHOD, DRILLING METHOD, AND TOOL PATH-GENERATING DEVICE

CROSS-REFERENCE TO RELATED APPLICATION

This application is a U.S. National Stage Application of International Patent Application No. PCT/JP2015/060270, filed on Mar. 31, 2015, which is hereby incorporated by reference in the present disclosure in its entirety.

FIELD OF THE INVENTION

The invention relates to tool path generation for connecting two tool paths, and in particular relates to a tool path generating method, a hole machining method, and a tool path generation device for hole machining for forming a hole in a surface of a workpiece by using a rotating tool.

BACKGROUND OF THE INVENTION

Figure 5:
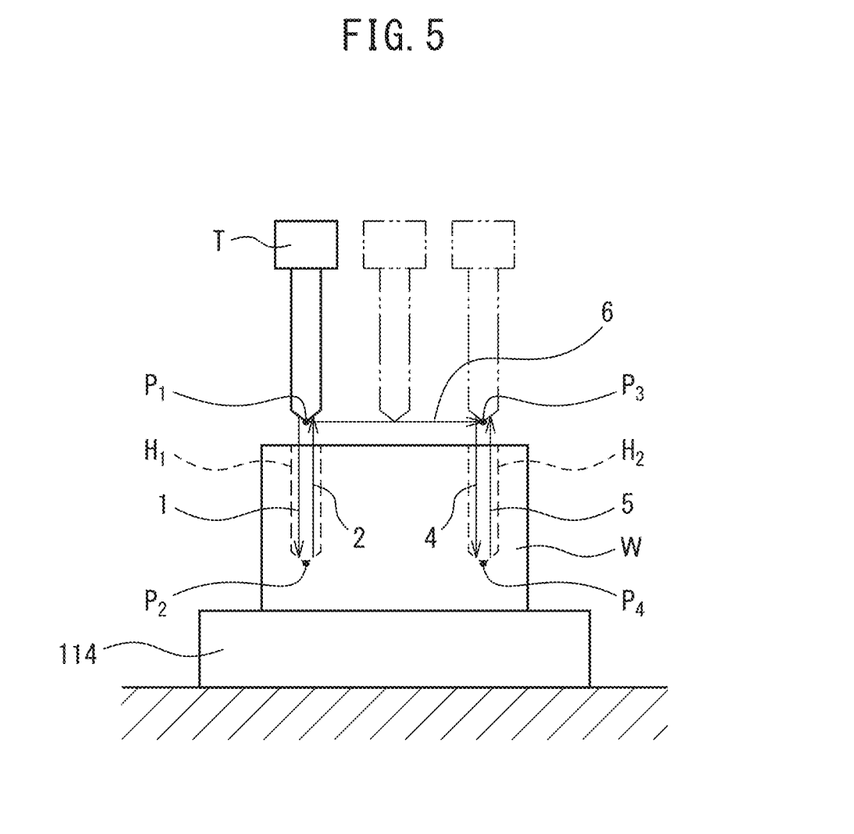
FIG. 5 is a schematic view for explaining machining of holes by a conventional tool path generating method.

When many holes are machined into a surface of a workpiece by using a rotating tool such as, for example, a drill, a tool T is positioned at a position corresponding to a hole H1 and then fed toward a workpiece W in the direction of the rotational axis of the tool T (Z-axis direction) (path 1) in order to machine the hole H1, as illustrated in FIG. 5. Then, the tool T is moved in the Z-axis direction so as to be separated from the workpiece W, and is removed from the hole H1 (path 2). After the end of the tool T is separated from the workpiece W, the tool T is fed, by X-axis and Y-axis feed devices, to a position corresponding to a succeeding hole H2 to be formed (path 6). After arriving at the position corresponding to the succeeding hole H2, the tool T is re-fed in the Z-axis direction toward the workpiece W to form the hole H2 (path 4). As described above, in movement of a tool from a machining site to a succeeding machining site with respect to a workpiece, it takes time to move the tool since it is necessary to temporarily stop the feed between the path 2 and the path 6 as well as between the path 6 and the path 4 in the example of FIG. 5 when the feed direction of the tool is changed.

Patent Literature 1 describes a machine tool for moving a movable body by using two drive devices, for example, an X-axis drive device and a Y-axis drive device, so as to shorten movement time. The machine tool of Patent Literature 1 is configured so that when it is necessary to change the direction of movement of a movable body to any one axial direction at at least one point in the case of moving the movable body under two-axis control, the movable body is gently accelerated or decelerated at not more than a maximum acceleration or deceleration rate in the axis direction to which the direction of the movement of the movable body is changed, and another drive device moves the movable body at the maximum lower limit rate, after the movable body arrives at the point of the change of the direction of the movement of the movable body.

PATENT PUBLICATIONS

Patent Literature 1: JP-A-2006-024174

BRIEF SUMMARY OF THE INVENTION

The invention of Patent Literature 1 has a problem in that although time for movement of the movable body can be reduced, control is a complicated, and it is necessary to define, in advance, the path, rate, and lower limit rate of the movable body, as well as a usual program for machining in an NC program input into a control device.

The invention is directed to solve of the problems of the prior art, and the object of the invention is to provide a tool path generating method and device, in which when a tool is moved with respect to a workpiece from a tool path to a neighboring tool path during machining the workpiece in a machine tool, a connection path that connects the two tool paths and allows time necessary for moving the tool to be reduced can be easily generated in a very short time and in real time; and a hole machining method using the tool path generating method.

In order to achieve the object described above, in accordance with the invention, there is provided a tool path generating method for generating a tool path for moving a tool and a workpiece relative to each other and machining the workpiece, the tool path generating method including: extracting two tool paths of which the movement directions are substantially opposite to each other; setting a reversing position, at which the feed direction of the tool is reversed, at a position, separated from the workpiece, between the end point of one of the two tool paths and the start point of the other of the two tool paths; calculating a connection path that passes through the end point of the one of the two tool paths, the reversing position, and the start point of the other of the two tool paths; and generating a tool path including the one of the two tool paths, the connection path, and the other of the two tool paths.

In accordance with the invention, there is provided a hole machining method for continuously machining first and the second holes in a workpiece by using a rotating tool that is mounted to an end of a spindle which rotates about a rotation axis, the hole machining method including: relatively moving the rotating tool from a position for end of the machining of the first hole in the workpiece to a position for start of the machining of the second hole in the workpiece along a connection path having the shape of an ellipse of which the major or minor axis is a line segment of which both ends are at the position for the end of the machining of the first hole and the position for start of the machining of the second hole after the end of the machining of the first hole; and driving the rotating tool toward the interior of the workpiece along the rotation axis.

In accordance with another feature of the invention, there is provided a hole machining method for machining first and second holes that extend in a Z-axis direction in a surface of a workpiece by a machine tool that includes X-, Y-, and Z-feed axes for relatively moving a rotating tool mounted to a tip of a spindle which rotates about a rotation axis and the workpiece arranged to face the spindle, in three-axis directions of X, Y, and Z, orthogonal to each other, in which the direction of the rotation axis of the spindle is set at the Z-axis, the hole machining method including: calculating distances in the X-axis and Y-axis directions between a position for end of the machining of the first hole and a position for start of the machining of the second hole; determining an X-axis reference value obtained by dividing the distance in the X-axis direction by the maximum acceleration of the X-feed axis as well as a Y-axis reference value obtained by dividing the distance in the Y-axis direction by the maximum acceleration of the Y-feed axis; setting a higher value of the X-axis reference value and the Y-axis reference value at a maximum reference value; multiplying the maximum reference value by the maximum acceleration of the Z-feed axis to determine a retraction distance in the Z-axis direction; generating a connection path having the shape of an ellipse of which the major or axis is a line segment of which both ends are at the position for the end of the machining of the first hole and the position for the start of the machining of the second hole, and which extends into a plane perpendicular to an XY plane, wherein the retraction distance is ½ of the minor or major axis of the ellipse; moving the rotating tool from the position for the end of the machining of the first hole in the workpiece to the position for the start of the machining of the second hole in the workpiece along the connection path; and driving the rotating tool toward the interior of the workpiece along the rotation axis.

In accordance with the invention, there is provided a tool path generation device for generating a tool path for moving a tool and a workpiece relative to each other and machining the workpiece, the tool path generation device including: an opposite path extracting section for extracting two tool paths of which the movement directions are substantially opposite to each other; a reversing position calculating section for calculating a reversing position, at which the feed direction of the tool is reversed, at a position, separated from the workpiece, between the end point of one of the two tool paths and the start point of the other of the two tool paths; and a tool path generating section for calculating a connection path that passes through the end point of the one of the two tool paths, the reversing position, and the start point of the other of the two tool paths, and for generating a tool path including the one of the two tool paths, the connection path, and the other of the two tool paths.

According to the invention, the connection path is generated only by calculating the ellipse. Therefore, the calculation for generating a tool path can be very easily performed in a short time, and it is not necessary to define calculations in an NC program in advance in a manner similar to the manner of the invention of Patent Literature 1.

DETAILED DESCRIPTION OF THE INVENTION

Preferred embodiments of the invention will be described below with reference to the accompanying drawings.

Figure 1:
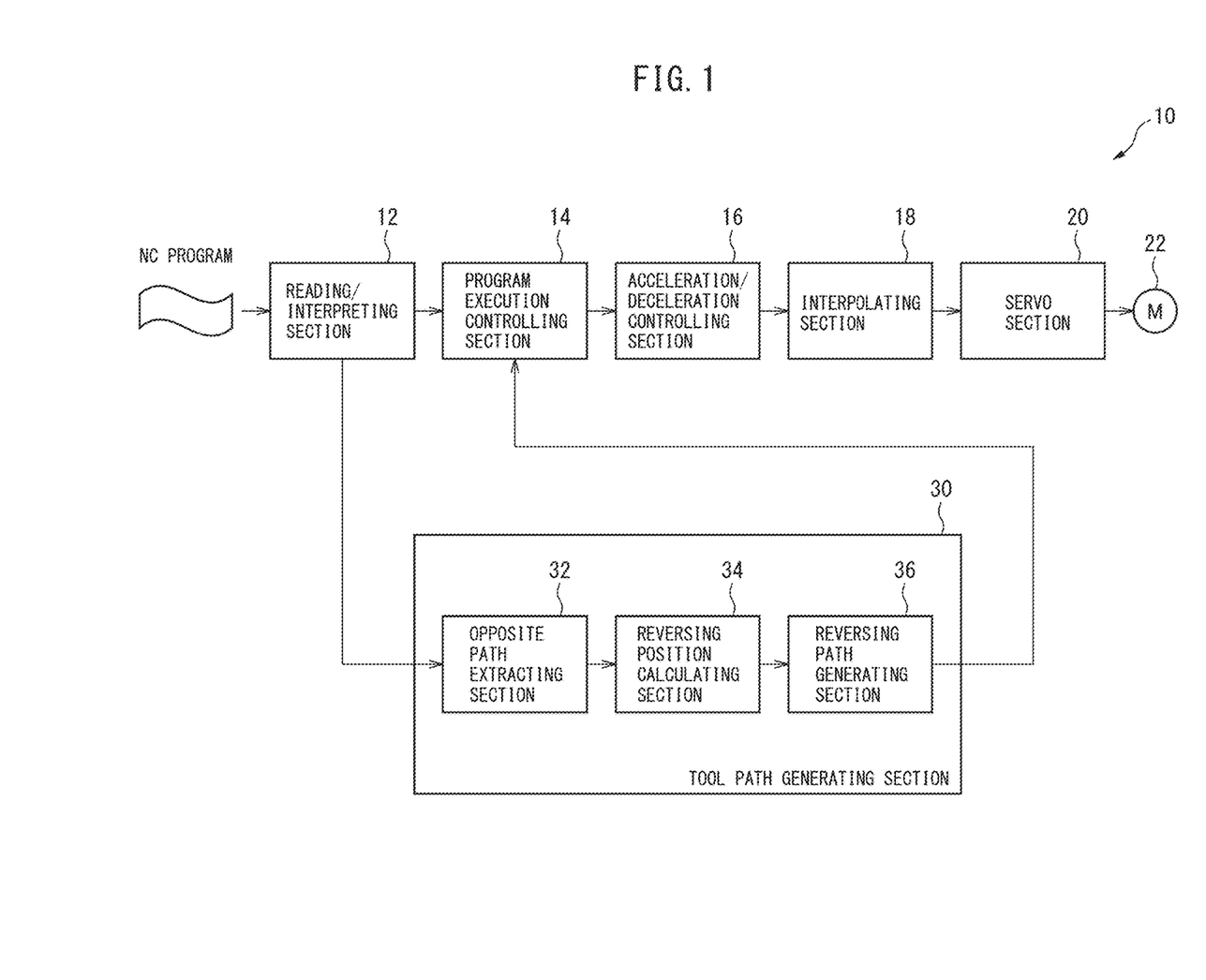
FIG. 1 is a block diagram illustrating a control device including a tool path generating section according to a preferred embodiment of the invention.
Figure 2:
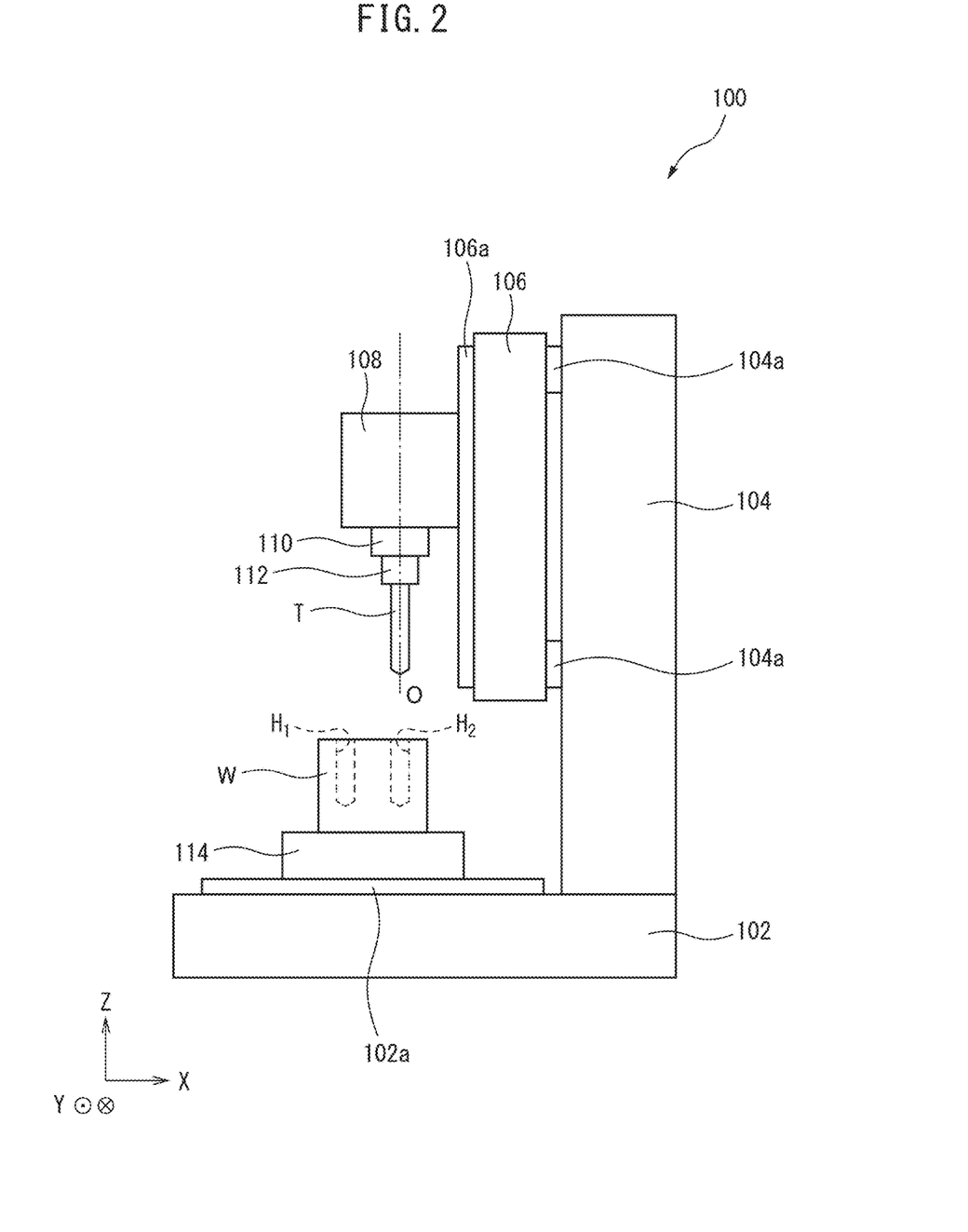
FIG. 2 is a side view illustrating an example of a machine tool to which the invention is applied.

Referring to FIG. 2, an example of a machine tool to which the invention is applied is illustrated. In FIG. 2, a machine tool 100 according to a preferred embodiment of the invention forms a vertical type machining center and includes: a bed 102 as a base fixed to a floor surface of a factory; a table 114 which is disposed movably in a forward-backward direction or an X-axis direction (horizontal direction in FIG. 1) on a top surface of a front portion (left in FIG. 1) of the bed 102, and to which a workpiece W is fixed; a column 104 which is erected and fixed on a top surface of the bed 102, in a rear end side (right in FIG. 1) of the bed 102; a saddle 106 which is disposed movably in a horizontal direction or a Y-axis direction (direction perpendicular to the paper face of FIG. 1) on a front surface of the column 104; a Z-slider 108 which is mounted movably in a vertical direction or a Z-axis direction on a front surface of the saddle 106; and a spindle head 110 which is mounted on the Z-slider 108 and rotatably supports a spindle 112.

The table 114 is disposed for moving reciprocally along a pair of X-axis guide rails 102a disposed to extend in the horizontal X-axis direction on the top surface of the bed 102. A ball screw (not illustrated) that is disposed to extend in the X-axis direction and an X-axis servomotor that is linked to one end of the ball screw are disposed, as an X-axis feed device for reciprocally driving the table 114 along the X-axis guide rails 102a, on the bed 102, and a nut (not illustrated) which engages with the ball screw is mounted on the table 114. An X-axis scale (not illustrated) for measuring the X-axis direction coordinate position of the table 114 in the X-axis direction is mounted on the table 114.

The spindle head 110 supports the spindle 112 rotatably about a central axis O that extends in the vertical direction parallel to the Z-axis. A tool mount hole (not illustrated) for mounting a rotating tool T to a tip of the spindle 112, facing the table 114, is machined in the spindle 112. The spindle head 110 includes a servomotor (not illustrated) for rotationally driving the spindle 112.

The saddle 106 is disposed for moving reciprocally along a pair of Y-axis guide rails 104a disposed to extend in the Y-axis direction on the front surface of the upper portion of the column 104. A ball screw (not illustrated) that is disposed to extend in the Y-axis direction and a Y-axis servomotor that is linked to one end of the ball screw are disposed, as a Y-axis feed device for reciprocally driving the saddle 106 along the Y-axis guide rails, on the column 104, and a nut (not illustrated) which engages with the ball screw is mounted on the saddle 106. A Y-axis scale (not illustrated) for measuring the Y-axis direction coordinate position of the saddle 106 is mounted on the column 104.

The Z-slider 108 is disposed for moving reciprocally along a pair of Z-axis guide rails 106a disposed to extend in the Z-axis direction on the front surface of the saddle 106. A ball screw (not illustrated shown) that is disposed to extend in the Z-axis direction and a Z-axis servomotor (not illustrated) that is linked to one end of the ball screw are disposed, as a Z-axis feed device for reciprocally driving the Z-slider 108 along the Z-axis guide rails, on the saddle 106, and a nut (not illustrated) which engages with the ball screw is mounted on the spindle head 110. A Z-axis scale (not illustrated) for measuring the Z-axis direction coordinate position of the Z-slider 108 is mounted on the saddle 106. The rotating tool T is fed along the central axis of the rotating tool T by the Z-axis feed device.

The X-axis servomotor, the Y-axis servomotor, and the Z-axis servomotor, as well as the X-axis scale, the Y-axis scale, and the Z-axis scale are connected to an NC device (not illustrated) for controlling the machine tool 100, and the NC device controls electric powers (current values) to be supplied to the X-axis servomotor, the Y-axis servomotor, and the Z-axis servomotor.

Referring to FIG. 1 which is a block diagram illustrating an example of a control device for carrying out a hole machining method of the invention, a control device 10 includes a reading/interpreting section 12, a program execution controlling section 14, an interpolating section 18, and a servo section 20 similar to typical NC devices. In other words, the control device 10 may be included in the NC device for the machine tool 100. The control device 10 further includes a tool path generating section 30 of the invention. The tool path generating section 30 includes an opposite path extracting section 32, a reversing position calculating section 34, and a reversing path generating section 36, as described below.

The reading/interpreting section 12 reads and interprets an NC program, and sequentially outputs executable program data to the program execution controlling section 14. The program execution controlling section 14 outputs moving commands to an acceleration/deceleration controlling section 16 based on the executable program data output from the reading/interpreting section 12. The moving commands include feed per revolution and feed rates in the X-axis, Y-axis, and Z-axis directions.

The acceleration/deceleration controlling section 16 applies an acceleration/deceleration processing to the feed rates of the respective axes by passing the moving commands, output from the program execution controlling section 16, through an acceleration/deceleration filter. The moving commands, after the acceleration/deceleration processing in the acceleration/deceleration controlling section 16, are output to the interpolating section 18. The interpolating section 18 performs interpolating operation on the received X-axis, Y-axis, and Z-axis moving commands, and outputs position commands, adapted to the interpolation function and the feed rates, to the servo section 20 for each of the axes. Each of the servo sections 20 outputs current values for driving the respective the X-, Y-, and Z-feed axes of the machine tool 100 based on the received X-, Y- and Z-axes position commands. The current values are respectively supplied to servomotors 22 of the X-, Y-, and Z-feed axes of the machine tool 100.

Figure 3:
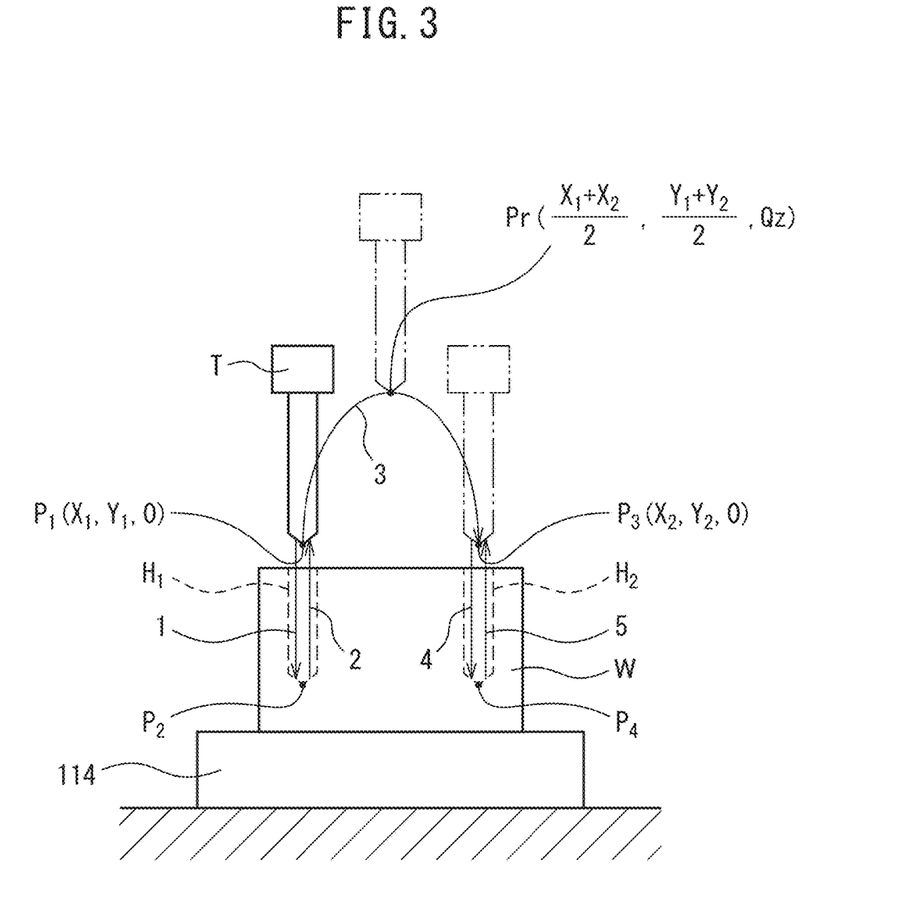
FIG. 3 is a schematic view for explaining machining of holes by a tool path generating method of the invention.

The opposite path extracting section 32 in the tool path generating section 30 extracts opposite paths from the NC program which has read and interpreted by the reading/interpreting section 12. The opposite paths are two adjacent tool paths (opposite paths) in which the movement directions of the tool T are substantially opposite to each other. In the present embodiment, when a workpiece W is machined by using a drill as the tool T to form adjacent first and second holes H1 and H2, as illustrated in FIG. 3, the tool T is axially linearly moved from a machining start point P1 toward a machining end point P2 of the first hole H1 (tool path 1) while being pressed against the workpiece W, and then moved from the machining end point P2 toward the machining start point P1 along the same path as the tool path 1 in the opposite direction away from the workpiece W (tool path 2). The tool T is then moved through a connection path 3 to a machining start point P3, i.e., the position where the machining for the second hole H2 is started, axially linearly moved from the machining start point P3 toward a machining end point P4 (tool path 4) while being pressed against the workpiece W, and then moved along the same straight line as the tool path 4 from the machining end point P4 toward the machining start point P3 in the opposite direction away from the workpiece W (tool path 5). In the example of FIG. 3, the adjacent tool paths 2 and 4 correspond to the opposite paths. The tool paths 1 and 2 do not correspond to the opposite paths since they are collinear paths and are not adjacent paths, although the movement directions of the tool T in the tool paths 1 and 2 are opposite to each other. Similarly, the tool paths 4 and 5 do not correspond to the opposite paths.

In the following description, the preceding tool path 2 of the tool paths 2 and 4, forming the opposite paths, is referred to as a first tool path, and the succeeding tool path 4 is referred to as a second tool path. P1 is the machining end position for the first hole H1, i.e., the end point of the first tool path 2. P3 is the machining start position for the second hole H2, i.e., the start point of the second tool path 4.

The reversing position calculating section 34 calculates a reversing position Pr at which the movement direction of the tool T is reversed on the connection path 3 based on the program data relating to the opposite paths extracted by the opposite path extracting section 32, as described below. The reversing path generating section 36 generates a reversing path based on the program data relating to the opposite paths extracted by the opposite path extracting section 32 and the coordinate of the reversing position Pr calculated by the reversing position calculating section 34. In the example of FIG. 3, the reversing path is the connection path 3 that passes through the reversing position Pr between the first tool path 2 which is a path through which the tool T is pulled back from the first hole H1 and the second tool path 4 which is a tool path for machining the second hole H2.

Referring to a flowchart of FIG. 4, a method for generating the reversing path in the example illustrated in FIG. 3 will be described. In FIG. 3, the horizontal direction in the coordination system is defined as the X-axis, the direction perpendicular to the plane of FIG. 3 is defined as the Y-axis, and a position, apart from the top surface of the workpiece W by a desired distance in the Z-axis direction, is defined as Z=0. A user can be set any point as the position, apart from the surface of the workpiece W by a desired distance, in consideration of a clearance amount for avoiding a collision between the tool and the workpiece due to the shape error and dimensional error of the surface of the workpiece. The position corresponds to a position referred to as an R-point in G-code fixed cycles of machining programs.

After the opposite path extracting section 32 extracts the opposite paths 2 and 4 from the NC program read and interpreted by the reading/interpreting section 12, the reversing position calculating section 34 reads the coordinate (X1, Y1, 0) of P1 and the coordinate (X2, Y2, 0) of P2 from the NC program read and interpreted by the reading/interpreting section 12 (step S10). The following parameters can be previously stored in a memory area of the tool path generating section 30.

Alternatively, an operator of the machine tool 100 may manually input the parameters appropriately.

Ax=maximum acceleration of feed axis in X-direction
Ay=maximum acceleration of feed axis in Y-direction
Az=maximum acceleration of feed axis in Z-direction Then, Lx=distance between the opposite paths in X-direction=X2−X1; and
Ly=distance between the opposite paths in Y-direction=Y2−Y1 are calculated.

Then, Lx/Ax and Ly/Ay are compared with each other (step S12). When Lx/Ax is more than Ly/Ay (Yes in step S12), i.e., when time for movement of the tool T in the X-axis direction can be determined to be longer than time for movement of the tool T in the Y-axis direction, the retraction distance Qz of the tool T in the Z-axis direction is calculated from the following equation (step S14).

$$Qz = (Lx/Ax) \times Az$$

When Lx/Ax is less than Py/Ay (No in step S12), the retraction distance Qz of the tool T in the Z-axis direction is calculated by the following equation (step S16).

$$Qz = (Ly/Ay) \times Az$$

When the retraction distance Qz in the Z-axis direction is calculated, the coordinate of the reversing position Pr is calculated from the following equation in step S18. Ly=0 is achieved by mounting the workpiece W on the table 114 so that the first and second holes H1 and H2 are aligned, for example, in the X-axis direction.

$$Pr(X,Y,Z)=((X1+X2)/2,(Y1+Y2)/2,Qz)$$

Then, the reversing path generating section 36 calculates the connection path 3 having the shape of an ellipse which passes through P1, Pr, and P3, and of which a vertex is the reversing position Pr. In other words, the upper half of the ellipse of which one of the symmetry axes passes through P1 and P3 and the other of the symmetry axes passes through the reversing position Pr is regarded as the connection path 3. More specifically, the connection path 3 is defined by the upper half, above an X-Y plane at Z=0, of the ellipse, including, as the major or minor axis thereof, a line segment of which both ends are P1 and P3, and passing through the reversing position Pr, in a plane perpendicular to the X-Y plane of Z=0. The reversing path generating section 36 outputs the connection path 3 calculated in such a manner as well as the first and second tool paths 2 and 4 to the program execution controlling section 14.

Since the connection path 3 of the present embodiment is connected to the first tool path 2 and the second tool path 4 in a tangential direction at the end point P1 of the first tool path 2 and the start point P3 of the second tool path 4, the tool T can be moved relatively with respect to the workpiece W along the connection path 3 at very high speed. In other words, the tool T is separated from the workpiece W while accelerating through the tool path 2, and passes through P1 at a rate in the Z-axis direction, maintained at the rate of the command for machining. Then, the tool T decelerates to have a rate of zero in the Z-axis direction and the reversed rate in the Z-axis direction at the reversing position Pr, and accelerates in the reverse direction toward P3. The rate in the Z-axis direction arrives at the rate of the command for machining before the tool T passes through P3. Since there is only one point at which the rate in the Z-axis direction is zero on the connection path 3 as described above, time necessary for movement is reduced, and the tool T can be moved relatively with respect to the workpiece W at very high speed. Since the reversing position Pr in the Z-axis direction is also calculated based on the distance between the first and second holes H1 and H2 as well as on the maximum rate of each feed axis, an efficient path is obtained in which the reversing position Pr in the Z-axis direction is prevented from being too much apart from the workpiece W.

In addition, since a position that is furthest from the workpiece W is regarded as the reversing position Pr and the path that passes through the reversing position Pr is generated, there is also an advantage in that it is preferable to determine interference between a tool and a peripheral device and to determine whether a path passes through a position beyond the stroke range of a feed axis by evaluating only the coordinate of the reversing position Pr, and in that it can be easily determined whether or not the generated connection path 3 is an available path.

According to the present embodiment, the connection path 3 is generated only by reading the centers P1 and P3 of the two holes H1 and H2 adjacent to each other from the NC program, calculating Pr based on the centers, and calculating the ellipse that passes through the three points P1, Pr, and P3, therefore, the calculations can be very easily performed in a short time, and therefore, it is not necessary to define calculations in an NC program in advance in a manner similar to the manner of the invention of Patent Literature 1.

Figure 4:
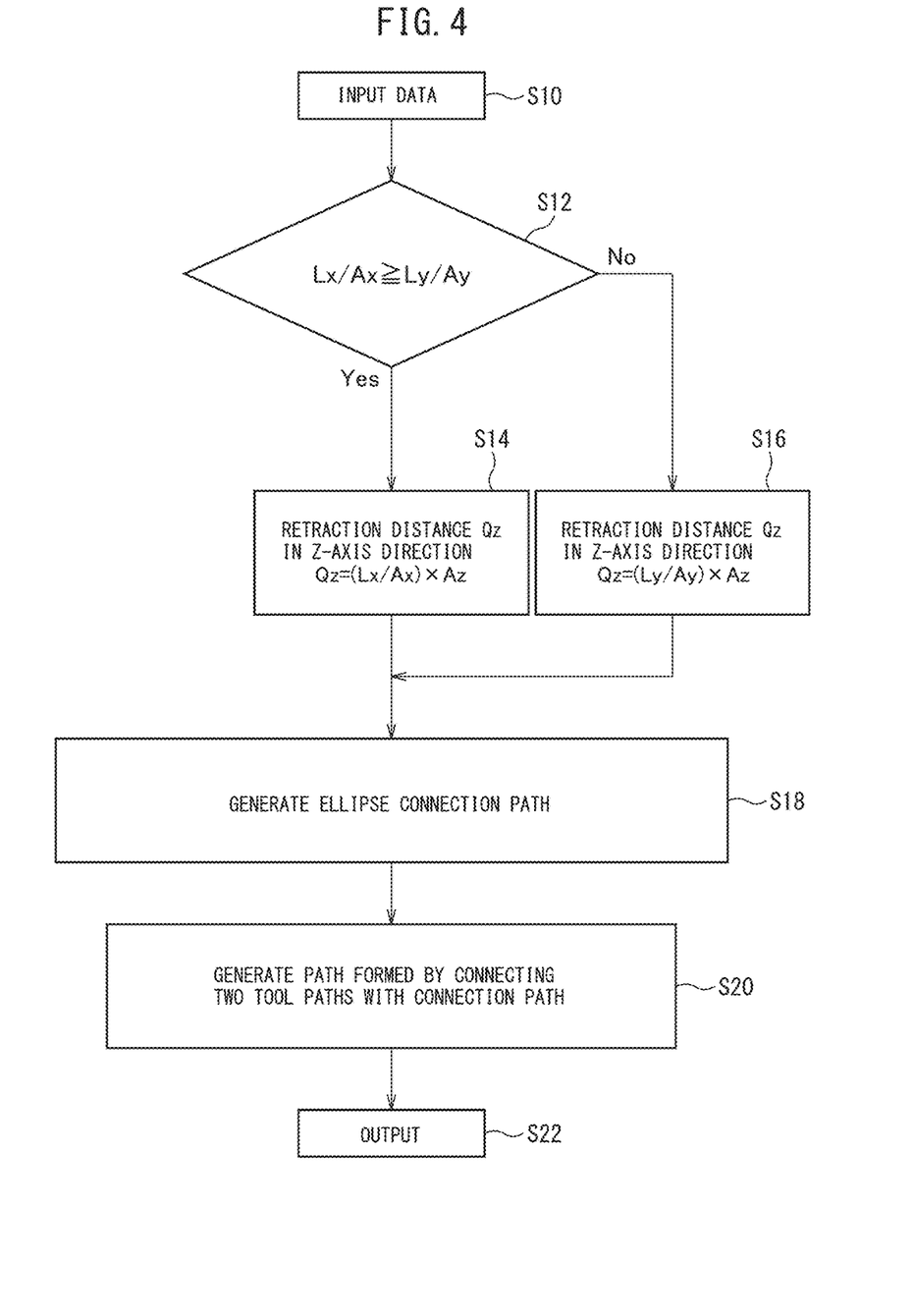
FIG. 4 is a flowchart for explaining the tool path generating method of the invention.

The retraction distance Qz of the tool T in the Z-axis direction is calculated simply based on the distance between the axes of the first and second holes H1 and H2 or the distance between the centers of the first and second holes H1 and H2 in the workpiece W, i.e., the pitch between the machined holes, as well as the maximum acceleration of the X- or Y-feed axis in the method illustrated in FIG. 4, but the invention is not limited thereto. The small depth of a machined hole can result in deceleration in a short distance and enables the tool T to be smoothly moved at high speed even when the tool T is separated far from the workpiece W because of resulting in a short distance for acceleration and preventing the feed rate in the Z-axis from being high when the tool T is separated from the hole. Thus, it is also acceptable to formulate Qz=αLd when a comparison of (Lx/Ax)×Az and (Ly/Ay)×Az as described above with αLd obtained by multiplying the smaller depth Ld of the first and second holes H1 and H2 by a constant α reveals that αLd is less than (Lx/Ax)×Az and (Ly/Ay)×Az. The α can be determined by experiment or the like in advance although varying according to the characteristics of a machine tool, and can be set at, for example, α=1.2.

REFERENCE SIGNS LIST

2 First Tool Path
3 Connection Path
4 Second Tool Path
10 Control Device
12 Reading/Interpreting Section
14 Program Execution Controlling Section
30 Tool Path Generating Section
32 Opposite Path Extracting Section
34 Reversing Position Calculating Section
36 Reversing Path Generating Section

The invention claimed is:

1. A hole machining method for machining first and second holes extending in a Z-axis direction in a surface of a workpiece by a machine tool that comprises X-, Y-, and Z-feed axes for relatively moving a rotating tool mounted to an end of a spindle which rotates about a rotation axis and the workpiece arranged to face the spindle, in three-axis directions of X, Y, and Z, orthogonal to each other, in which a direction of the rotation axis of the spindle is set at the Z-axis, the hole machining method characterized by:
   calculating distances in the X-axis and Y-axis directions between a position for end of the machining of the first hole and a position for start of the machining of the second hole;
   determining an X-axis reference value obtained by dividing the distance in the X-axis direction by a maximum acceleration of the X-feed axis as well as a Y-axis reference value obtained by dividing the distance in the Y-axis direction by a maximum acceleration of the Y-feed axis;
   setting a higher value of the X-axis reference value and the Y-axis reference value at a maximum reference value;
   multiplying the maximum reference value by a maximum acceleration of the Z-feed axis to determine a retraction distance in the Z-axis direction;
   generating a connection path having a shape of an ellipse of which a major or minor axis is a line segment of which both ends are at the position for the end of the machining of the first hole and the position for the start of the machining of the second hole, and which extends into a plane perpendicular to an XY plane, wherein the retraction distance is ½ of the minor or major axis of the ellipse;

moving the rotating tool from the position for the end of the machining of the first hole in the workpiece to the position for the start of the machining of the second hole in the workpiece along the connection path; and driving the rotating tool toward an interior of the workpiece along the rotation axis.

\* \* \* \* \*